US010275286B2

United States Patent
Chen et al.

(10) Patent No.: US 10,275,286 B2
(45) Date of Patent: Apr. 30, 2019

(54) MANAGEMENT SYSTEMS OF CLOUD RESOURCES AND MANAGEMENT METHODS THEREOF

(71) Applicant: Quanta Computer Inc., Taoyuan (TW)

(72) Inventors: Wen-Kuang Chen, Taoyuan (TW); Chun-Hung Chen, Taoyuan (TW); Chien-Kuo Hung, Taoyuan (TW); Chen-Chung Lee, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 165 days.

(21) Appl. No.: 15/651,135

(22) Filed: Jul. 17, 2017

(65) Prior Publication Data

US 2018/0267833 A1 Sep. 20, 2018

(30) Foreign Application Priority Data

Mar. 16, 2017 (TW) .............................. 106108668 A

(51) Int. Cl.
*G06F 9/44* (2018.01)
*G06F 9/50* (2006.01)
*G06F 9/455* (2018.01)
*G06F 11/34* (2006.01)

(52) U.S. Cl.
CPC .......... *G06F 9/505* (2013.01); *G06F 9/45558* (2013.01); *G06F 9/5077* (2013.01); *G06F 9/5083* (2013.01); *G06F 9/50* (2013.01); *G06F 11/3409* (2013.01); *G06F 2009/4557* (2013.01); *G06F 2009/45562* (2013.01); *G06F 2009/45575* (2013.01)

(58) Field of Classification Search
CPC ........................................................ G06F 9/44
USPC .................................................. 717/104–106
See application file for complete search history.

(56) References Cited

U.S. PATENT DOCUMENTS

| 2014/0280956 A1* | 9/2014 | Shu ...................... H04L 67/1004 709/226 |
| 2017/0041379 A1* | 2/2017 | Zhu ...................... H04L 12/4641 |
| 2018/0018244 A1* | 1/2018 | Yoshimura .............. G06F 13/00 |
| 2018/0121248 A1* | 5/2018 | Delaney ................ G06F 9/5077 |

* cited by examiner

*Primary Examiner* — Jae U Jeon
(74) *Attorney, Agent, or Firm* — McClure, Qualey & Rodack, LLP

(57) ABSTRACT

A management method of cloud resources is provided for use in a hybrid cloud system with first and second cloud systems, wherein the first cloud system includes first servers operating first virtual machines (VMs) and the second cloud system includes second servers operating second VMs, the method including the step of: collecting, by a resource monitor, performance monitoring data of the first VMs within the first servers; analyzing, by an analysis and determination device, the performance monitoring data collected to automatically send a trigger signal in response to determining that a predetermined trigger condition is met, wherein the trigger signal indicates a deployment target and a deployment type; and automatically performing, by a resource deployment device, an operation corresponding to the deployment type on the deployment target in the second cloud system in response to the trigger signal.

7 Claims, 6 Drawing Sheets

MANAGEMENT SYSTEMS OF CLOUD RESOURCES AND MANAGEMENT METHODS THEREOF

CROSS REFERENCE TO RELATED APPLICATIONS

This Application claims priority of Taiwan Application No. 106108668, filed on Mar. 16, 2017, and the entirety of which is incorporated by reference herein.

BACKGROUND OF THE INVENTION

Field of the Invention

The invention relates to resource management systems and methods thereof, and more precisely, to management systems and related methods for managing cloud resources of a plurality of virtual machines in a hybrid cloud system.

Description of the Related Art

With the rapid progress of science and technology, virtualization technology for computer systems has become more and more popular. As virtualization technology has become one of the mainstream of the Infrastructure as a Service (IaaS) technology, various manufacturers provides uninterrupted renting services for virtual machines to achieve the goal for high service level agreements (SLA).

In recent years, hybrid cloud management has become a hot topic of IaaS technology, through a hybrid cloud system, virtual machine resources can be effectively distributed, so that users can be provided with better services such as applying virtual machines to the webpage, network application services, program computing, grid computing and other needs and each user can have their own host device and operating system environment. For service providers, because different virtual machines may use resources of the same physical host devices, they can save energy and reduce room space required for the host devices.

On the other hand, in order to improve the user's satisfaction while using the network services, most companies use a resource auto-scaling technology for expanding the resources. However, limited to the company's network and hardware server resources, current resource expansion technologies are unable to meet the needs of each network service. Accordingly, companies began to look for the use of resources in the public cloud, and the cost of buying hardware server burden can be reduced with the use of resources in the public cloud. However, before the use of public cloud resources, the company's administrators must be in great trouble to build public cloud services and the built public cloud services may not be able to effectively measure the usage statuses of all the network services, thereby encountering problems in that resources may need to be continually expanded and causing cost increases when using the resources in the public cloud for management. In this way, even if the virtual machines have been built on a hybrid cloud system, users may still need to decide and determine whether to build resources in the public cloud manually, such that the public cloud resources purchased can't be fully utilized.

BRIEF SUMMARY OF THE INVENTION

One embodiment of the invention provides a management method of cloud resources for use in a hybrid cloud system with first and second cloud systems, wherein the first cloud system includes first servers operating first virtual machines (VMs) and the second cloud system includes second servers operating second VMs, the method including the step of: obtaining, by a resource monitor, a plurality of performance monitoring data of the first VMs within the first servers; analyzing, by an analysis and determination device, the performance monitoring data of the first VMs to automatically send a trigger signal in response to determining that a predetermined trigger condition is met, wherein the trigger signal includes a deployment target and a deployment type; and automatically performing, by a resource deployment device, an operation corresponding to the deployment type on the deployment target in the second VMs of the second cloud system in response to the trigger signal.

Another embodiment of the present invention provides a management system of cloud resources, comprising a first cloud system, a second cloud system and a management device. The first cloud system comprises a plurality of first servers, wherein the first servers are operating a plurality of first virtual machines (VMs). The second cloud system comprises a plurality of second servers, wherein the second servers are operating a plurality of second VMs. The management device is coupled to the first cloud system and the second cloud system via a network, comprising: a resource monitor coupled to the first VMs and the second VMs, collecting and obtaining a plurality of performance monitoring data of the first VMs within the first servers; an analysis and determination device coupled to the resource monitor, analyzing the performance monitoring data of the first VMs to automatically send a trigger signal in response to determining that a predetermined trigger condition is met, wherein the trigger signal includes a deployment target and a deployment type; and a resource deployment device coupled to the analysis and determination device, automatically performing, by a resource deployment device, an operation corresponding to the deployment type on the deployment target in the second VMs of the second cloud system in response to the trigger signal.

Management methods may be practiced by the disclosed apparatuses or systems which are suitable firmware or hardware components capable of performing specific functions. Methods may also take the form of a program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Embodiments of the invention provide management systems and related management methods for managing cloud resources of a plurality of virtual machines (VMs) in a hybrid cloud system, which can provide methods for providing service configuration and recycling by providing quickly and automatically configuration of virtualization resources on two hybrid clouds configured on a hardware hypervisor. The embodiments of the present invention can instantly monitor the load and/or performance status of each virtual machine on the virtualized platform, and once the load and/or performance status has reached a threshold condition set by the user or the system, one or more virtual machines are automatically added and configured on another virtualized service platform to provide more computing resources and services, thereby achieving a goal for dynamically and quickly replying to the requirements. On the other hand, when the computing resources and services are enough, virtual machines on another virtualized service platform can be automatically removed or recycled, thus achieving a goal for saving computing resources, power and cost.

Moreover, in order to speed up the expansion and creation of resources on two different virtualized service platforms of the two cloud systems, the embodiment of the present invention further provides a stock pool of computing resources, which is pre-built in the second cloud system and can store contents in unit of virtual machine templates or individual software services. When it is determined that additional computing resources need to be added, computing resources can be taken directly from the stock pool and deployed to a second virtualized environment of the second cloud system and then respective virtual machine can be joined to provide the service in the second virtualized environment after deployment. By doing so, time required for automatically setting up and configuring the virtual machine can be effectively reduced, thus greatly shortening the response time and reducing time for the shortage of resources.

Figure 1:
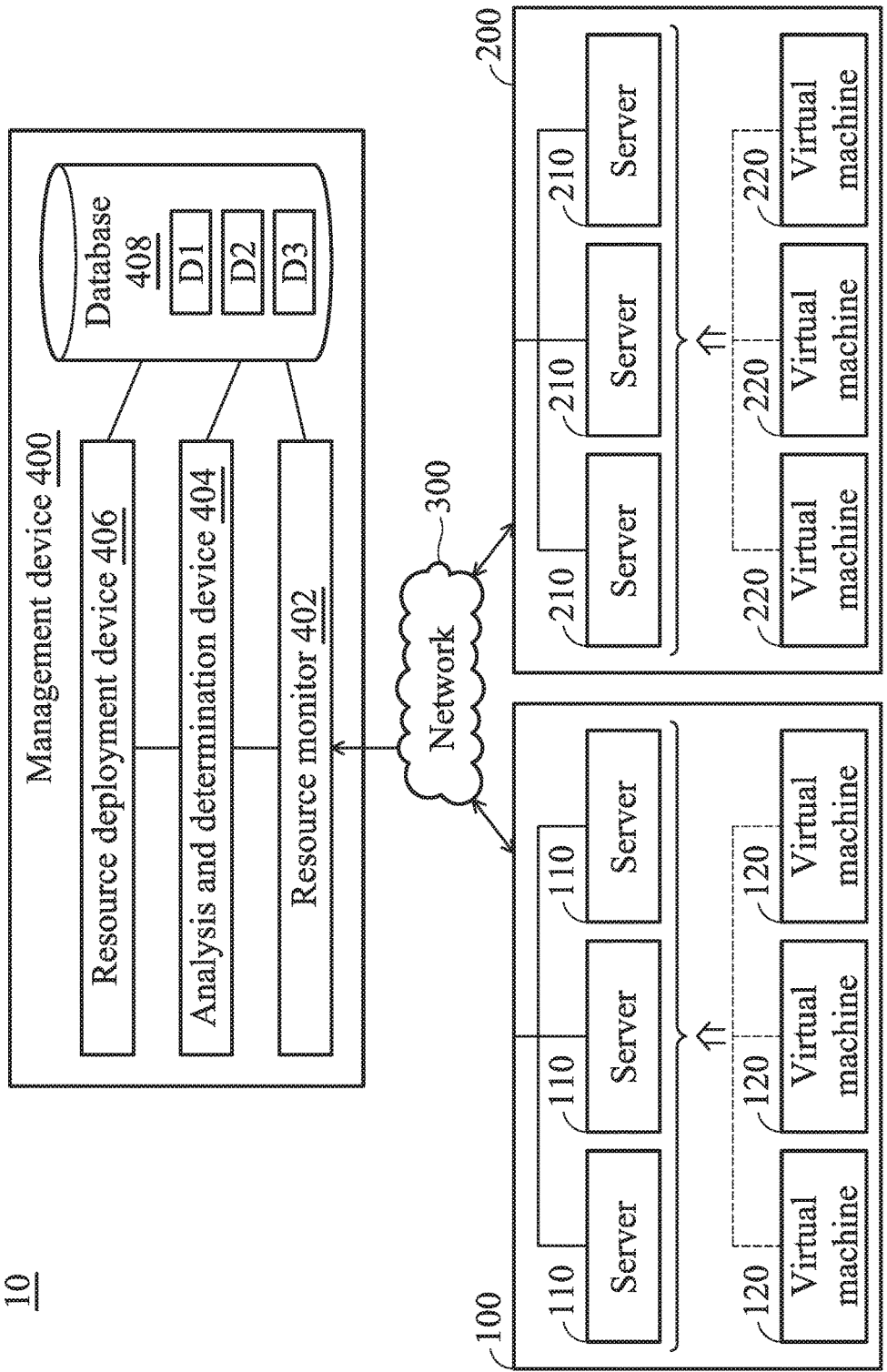
FIG. 1 shows a schematic diagram of a management system of cloud resources in a hybrid cloud system according to an embodiment of the present invention.

FIG. 1 is a schematic diagram illustrating an embodiment of a management system 10 of cloud resources in a hybrid cloud system of the invention. As shown in FIG. 1, the management system of cloud resources 10 (hereinafter referred to as the management system 10) includes at least one cloud system 100 (i.e., a first cloud system), one cloud system 200 (i.e., a second cloud system), and one management device 400. The cloud system 100 includes a plurality of servers 110 (i.e., first servers) and each server 110 may operate one or more virtual machines 120 (i.e., first virtual machines), wherein each virtual machine 120 may perform one to a number of operating programs or applications to operate or to provide specific services. In some embodiments, each virtual machine 120 may be operated by a corresponding one of the servers 110, and each server 110 may include one or more virtual machines 120. To be more specific, that the virtual machine 120 is configured on the server 110 represents that the virtual machine 120 activates on the server 110 and uses the system resources on the server 110, such as processor, memory and others to run specified services or applications. Similarly, the cloud system 200 includes a plurality of servers 210 (i.e., second servers) and each server 210 may operate one or more virtual machines 220 (i.e., second virtual machines), wherein each virtual machine 220 may perform one to a number of operating programs or applications to operate or to provide specific services. In some embodiments, each virtual machine 220 may be operated by a corresponding one of the servers 210, and each server 210 may include one or more virtual machines 220. To be more specific, that the virtual machine 220 is configured on the server 210 represents that the virtual machine 220 activates on the server 210 and uses the system resources on the server 210, such as processor, memory and others to run specified services or applications.

The cloud system 100 and the cloud system 200 may through a physical network 300, such as a wired network, such as the Internet, and/or a wireless network, such as WCDMA network, 3G network, Wireless Local Area Network (WLAN), Bluetooth or other wireless network to connect to the management device 400 for performing wireless communications and data transmission between each other. In one embodiment, the cloud system 100 may be a private cloud system and the cloud system 200 may be a public cloud system, which may be coupled to each other and transmit data therebetween through a dedicated VPN network.

The management device 400 may be used to manage the cloud system 100 and the cloud system 200 through the network 300, including, for example, collecting load status and performance monitoring data of each virtual machines 120 and 220 within the servers 110 and 210, respectively, and running status of each virtual machine within each server and information regarding the location of each virtual machine allocated and so on. For example, the performance monitoring data may include performance indicators related to the hardware and software of the virtual machine, such as the performance status data of the virtual machine and the software service status data. The performance status data of the virtual machine may include usage of the virtual machine CPU, memory and hard disk read and write performance and network transmission or reception traffic, hard disk read or write traffic, and so on. The software service status data represents the software service statuses of the virtual machine, which includes the IIS service status, Windows service status, the number of Web Request connections, and so on. Details of the performance monitoring data and the software service status data will be described further in the following paragraphs. The management device 400 includes at least one resource monitor 402, an analysis and determination device 404, a resource deployment device 406, and a database 408. The resource monitor 402 is coupled to the virtual machines 120 and 220, which can collect all the necessary information within all of the servers 110 and 210 and all of the virtual machines 120 and 220. The analysis and determination device 404 is coupled to the resource monitor 402, which can be used to analyze the information collected by the resource monitor 402 and perform a plurality of determinations. The resource deployment device 406 is coupled to the analysis and determination device 404, which can automatically perform dedicated subsequent processing on triggered condition when the analysis and determination device 404 determines that a trigger condition is met. In the embodiments, all the virtual machines 120 of the cloud system 100 can form a first virtualized environment and a first virtual platform, and all the virtual machines 220 of the cloud system 200 can form a second virtualized environment and a second virtual platform. The database 408 may be used to store information such as the resource item data to be monitored and trigger condition definition data including definition data of trigger conditions for auto expansion/auto scaling to provide guidelines in a data collection and determination of whether to trigger an auto expansion operation and determination of which expansion is being triggered for the analysis and determination device 404 to determine whether the computing resources of the virtual machines 120 within the cloud system 100 is sufficient based on the collected performance monitoring data of the virtual machines. The database 408 may at least store trigger condition definition data D1, deployment condition definition data D2, and reservation condition definition data D3. These information can be predefined by an administrator via a user interface using input tools such as keyboards, mice, touch panels, and so on. The administrator can define the threshold value of the performance indicators corresponding to the performance data of the virtual machine through the trigger condition definition data D1 to determine whether to expand or reduce the operation of the computing resource in the second virtualized environment. The deployment condition definition data D2 is used to set the virtual machine conditions required for the second virtualized environment deployment. If a deployment target (i.e., a target to be deployed) is a software service, the administrator can use the deployment condition definition data D2 for the software deployment and score the available virtual machines according to the set virtual machine conditions to select the environment to be deployed, wherein the conditions for scoring may include but not limited to: whether to specify a virtual machine, a service type of virtual machine, CPU performance score, network transmission or reception traffic, hard disk read or write traffic, upper and lower limits/bounds for stock virtual machines and so on. If the deployment target is a virtual machine, the administrator can use the deployment condition definition data D2 to define the data to set the relevant parameters of the virtual machine that need to be expanded in the second virtualized environment, the number of virtual machines being expanded, the upper and lower limits of the virtual machines being stocked, the maximum amount of virtual machine resources and so on.

The reservation condition definition data D3 is used to define the reservation conditions and provides requirement-related information of the cost control and resource control as determination criteria for the subsequent stock monitoring procedure. In order to meet the needs of cost control and resource control in reservation conditions, a stock pool (also referred to as "pool") is added to the second virtualized environment and a fixed number of virtual machines can be pre-configured for subsequent expansion in the pool. The pool is attached to an expansion cluster and can be deployed according to the deployment target and the expansion mechanism being triggered.

Specifically, the management device 400 can control operations of the resource monitor 402, the analysis and determination device 404 and the resource deployment device 406 to perform the management method of cloud resources of the present invention, which will be discussed further in the following paragraphs. To be more specific, the management device 400 can dynamically monitor any target that can be monitored and automatically perform the appropriate operation when setting standard has been reached in accordance with the set standard operating procedures, thereby avoiding the delay in processing time as much as possible.

However it should be understood by those skilled in the art that the invention is not limited thereto. For example, the management system 10 can also include more cloud systems and virtual machine groups, wherein each group can have resource monitors corresponding thereto and a plurality of virtual machines and the management device 400 can also be provided in one of the servers 110 and 210 or be configured on another separate server. In addition, the number of servers and the number of virtual machines may also be adjusted based on actual requirement and architecture. It should be understood by those skilled in the art that the management apparatus 400, the resource monitor 402, the analysis and determination device 404 and the resource deployment device 406 and other components of the invention may have sufficient hardware circuits, components and/or with the software, firmware, and combination thereof to achieve the desired functionalities.

Figure 2:
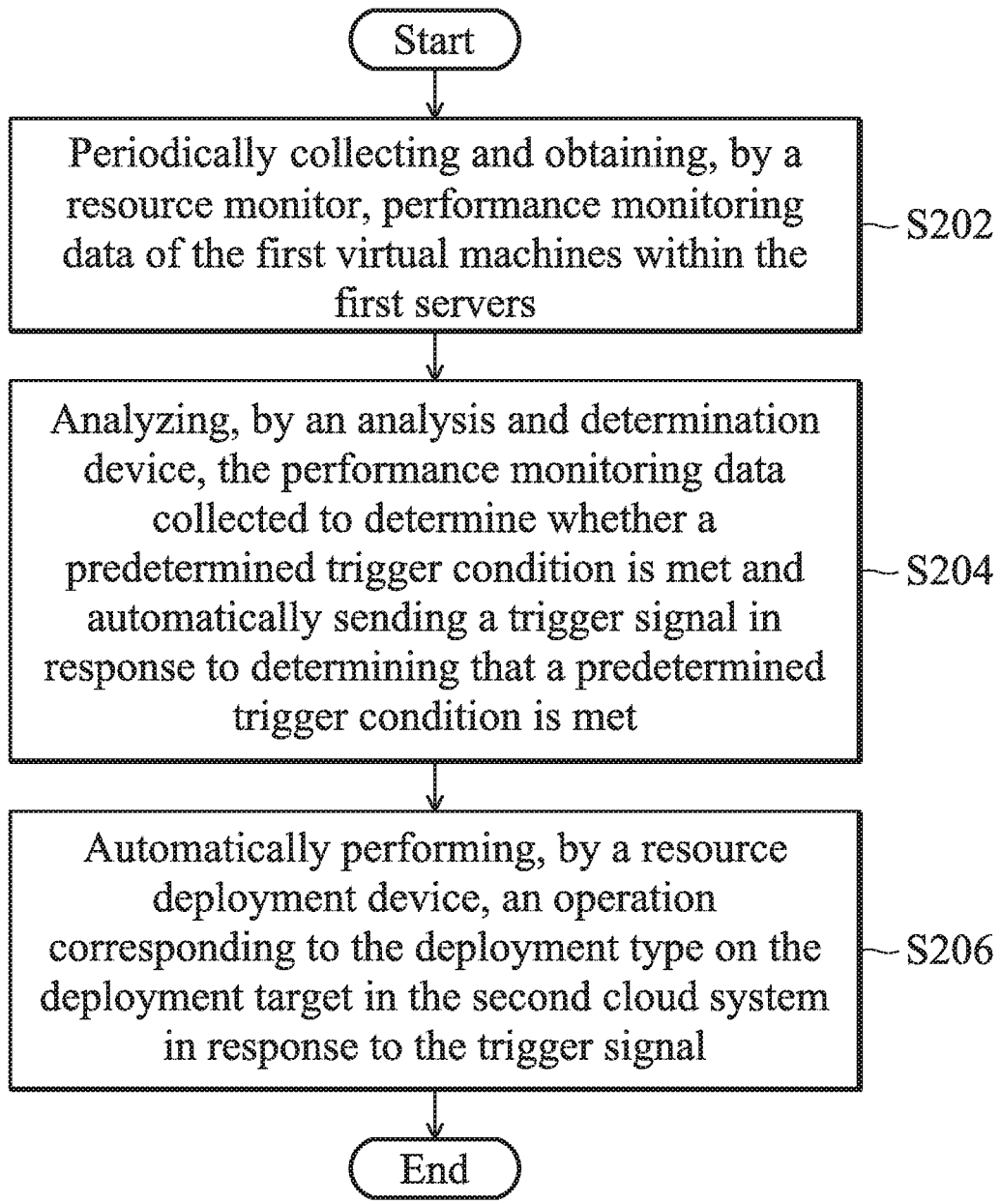
FIG. 2 is a flowchart illustrating a management method of cloud resources according to an embodiment of the present invention.

FIG. 2 is a flowchart showing a management method of cloud resources according to an embodiment of the present invention. Please refer to FIGS. 1 and 2. The management method of cloud resources can be applied to the management system 10 as shown in FIG. 1, which can remotely manage computing resources of all of virtual machines in the hybrid cloud system through the management device 400. In this embodiment, the first virtualized environment is a virtualized environment formed by all of the virtual machines 120 in the cloud system 100, the second virtualized environment is a virtualized environment formed by all of the virtual machine 220 in the cloud system 200, and the second virtualized environment is set with a stock pool (hereinafter also referred to as a pool) having a predetermined number of virtual machines.

In step S202, the resource monitor 402 periodically collects and obtains performance monitoring data for all the first virtual machines of the first cloud system. For example, the performance monitoring data may include performance indicators related to the hardware and software of the virtual machine, such as the performance status data of the virtual machine and the software service status data. The performance status data of the virtual machine may include the usage of the virtual machine CPU, memory and hard disk read and write performance, network transmission or reception traffic, hard disk read or write traffic, and so on. The software service status data represents the software service status of the virtual machine, including the IIS service status, Windows service status, the number of Web Request connections, and so on. The resource monitor 402 may provide basic monitoring on performance of each resource and operation status of each virtual machine (120) within each first server (server 110), such as the virtual machine CPU usage, memory usage pressure, disk read/write data per second and network sent/received data per second, software service status monitoring, such as IIS service status, Windows service status, the number of Web Request connections, etc., stored in the database 408 after obtaining the information through the resource monitoring mechanism to complete the monitoring data collection. In one embodiment, the database 408 may have monitoring data stored in advance, in order to define the items and statuses to be monitored, and the resource monitor 402 may collect the performance monitoring data within each virtual machine according to the stored monitoring data to realize the computing resource status of each virtual machine.

In step S204, the analysis and determination device 404 analyzes the collected performance monitoring data, and determines whether a predetermined trigger condition is met, and automatically sends a trigger signal in response to determined that the predetermined trigger condition is met. The trigger signal indicates a deployment target and a deployment type. The deployment target can be a virtual machine or a service. The deployment type includes an expansion type and a recycling type, which are being used to trigger an expansion or recycling operations of the virtual machine, respectively. In particular, the analysis and determination device 404 may determine whether to increase the computational resources or to decrease the computational resources in the second virtualized environment based on the threshold values of the performance indicators corresponding to the performance monitoring data of the virtual machine defined by the trigger condition definition data D1 stored in the database 408. Specifically, the analysis and determination device 406 may receive and analyze the performance monitoring data collected by the resource monitor 402, adjust weighting values of the collected performance indicators, such as the weighting value of monitored item "CPU" or "network traffic" according to the settings of the virtual machine and perform a weighting calculation on the indicators according to their weighting value and then sum up the calculation result of all of the indicators to generate a performance evaluation result.

For example, in one embodiment, it is assumed that there are two indicators "CPU" and "network traffic". If the virtual machine uses "CPU first", the weighting value of the indicator "CPU" can be increased (e.g., set the default weight value of the "CPU" from "1" to "1.2"); or if the virtual machine uses "network traffic first", the weighting value of the indicator "network traffic" can be increased. Then, all the performance indicators are weighted and scored according to their weighting value using a weighting calculation and the scores for weighting calculation of all of the performance indicators and the software service status conditions of the virtual machine are summed up to obtain a performance evaluation result so as to evaluate whether the event condition threshold has been reached. If the threshold has been reached, the analysis and determination device 404 will trigger the resource deployment device 406 to expand or recycle the virtual machine according to the set operation.

The expansion operation of the virtual machine may include at least one of the following operations: creating an empty virtual machine, booting/enabling a virtual machine and performing software deployment on the created virtual machine, but the invention is not limited thereto. The creation of the empty virtual machine may be performed by creating a virtual machine based on a software template, wherein the newly created virtual machine is in a shutdown or turned-off state. The step of booting/enabling a virtual machine is used to activate the virtual machine in the shutdown state through the boot program to become a booted or turned-on state to prepare for service configuration. The step of performing software deployment on the created virtual machine is used to deploy one or more services in the virtual machine that is in the turned-on state. In one embodiment, a virtual machine may deploy only one service. In another embodiment, a virtual machine may deploy two or more services. Among them, the empty virtual machine means that this virtual machine only configures/deploys the operating system without deploying any service thereon. In other words, any service can be configured on an empty virtual machine. This virtual machine can be used to perform a deployed service when an empty virtual machine is configured via a software deployment procedure (e.g., Web and domain settings) related to the service expected to be deployed (e.g., a Web service). For example, when a service to be deployed is a Web service, the Web service can be deployed on the empty virtual machine via a software deployment procedure of respective network environment setup (such as IP address setting, domain setting, etc.) to generate a virtual machine that supports/provides the Web service so as to provide the Web service for the users.

The recycling operation of the virtual machine may include at least one of the following operations: removing the software deployment corresponding to the service on the virtual machine, shutting down or disabling the empty or idle virtual machine and removing/deleting the virtual machine, but the invention is not limited thereto. Removal of the software deployment corresponding to the service on the virtual machine is used to remove one of the deployed services from the virtual machine that has been deployed with one or more services, such as removing a specified Service A by removing the associated software settings for the Service A. The step of shutting down the empty or idle virtual machine is used to shut the empty virtual machine down. After the shutdown of the virtual machine, it can be re-booted by corresponding boot procedure without needing to re-create it.

For example, the administrator may set a weighting value of the performance indicator "CPU" (i.e., the CPU usage) to 1.2 and set a threshold value to 80% in the trigger condition definition data, where the auto-expansion trigger condition is set to be met when the performance evaluation result is greater than the threshold value. In a case where the CPU performance data obtained from the first virtualized environment is 70% and continued for a period of time (for example, 5 minutes), the evaluation result of the performance indicators after weighted and summed up is equal to 84%, which has exceed 80%, and thus it is referred to as meeting the trigger condition since the threshold value is reached. In such case, the auto-expansion operation of the virtual machine needs to be performed. Then, the analysis and determination device 404 may send a trigger signal with a deployment type of an expansion type to trigger the resource deployment device 406 to perform automatic expansion operations of the virtual machine. Similarly, if the CPU performance data detected from the first virtual environment has been reduced to 60% or less than 60% for a period of time (e.g., 5 to 10 minutes) after the automatic expansion operation is performed, the evaluation result will be less than 80%, it is referred to as meeting the recycling condition. In such case, the auto-recycling operation of the virtual machine needs to be performed. Thus, the analysis and determination device 404 may send a trigger signal with a deployment type of a recycling type to trigger the resource deployment device 406 to perform the automatic recycling operation of the virtual machine. However, it should be understood that the above description is only a preferred embodiment of the present invention and the invention is not limited thereto.

Upon receiving the trigger signal sent by the analysis and determination device 404, in step S206, the resource deployment device 406 automatically performs an operation corresponding to the deployment type on the deployment target in the second cloud system in response to the trigger signal. Specifically, the resource deployment device 406 may perform a deployment environment selection based on the deployment condition definition data D2 predefined by the administrator in the database 408 and then perform a resource deployment operation corresponding to the deployment type specified by the trigger signal on the deployment target specified by the trigger signal in the selected deployment environment. To be more specific, when it is determined that the trigger condition is met, the resource deployment device 406 scores all of the virtual machines according to the deployment condition definition defined in the deployment condition definition data to select a virtual machine to be created or to select one of existing virtual machines to deploy. If the number of existing virtual machines is not enough, the resource deployment device 406 may further determine whether the computing resources of the second virtualized environment is enough and whether the cost of which has exceeded a default cost. The resource deployment is initiated only if the virtual machine with sufficient resources is available. In the embodiments of the invention, the deployment target may be a virtual machine or a service. In the example where the deployment target is a virtual machine, if the outward expansion mechanism (i.e., the deployment type is the expansion type) that increases the computational resources is triggered, the resource deployment device 406 may directly boot a virtual machine in the stock pool to join it to provide the computing service if the virtual machine with sufficient resources is available in the stock pool; and the resource deployment device 406 may shut down the redundant virtual machine into the stock management procedure when the inbound expansion or recycling mechanism (i.e., the deployment type is the recycling type) that decreases the computational resources is triggered.

The stock management procedure controls the number of virtual machines in the stock pool with a default stock upper limit value (hereinafter also referred to as a stock upper bound) and a stock lower limit value (hereinafter also referred to as a stock lower bound). The resource deployment device 406 may perform a stock monitoring procedure to automatically compensate for the amount of virtual machines which is a difference between the number of virtual machines in the stock pool and the stock limits when the number of virtual machines in the pool is insufficient for the value of the stock lower bound and the upper limit value of the cost is not reached. For example, it is assumed that the stock pool can have 5 virtual machines in maximum and the stock lower bound is set to 3. If the number of virtual machines in the pool is 2, the resource deployment device 406 automatically compensates for the difference number of virtual machines (where the difference=the value of stock lower bound−the number of virtual machines currently stored in the stock pool), i.e., one virtual machine ("1"), to the pool. When the number of virtual machines in the pool has exceeded the value of the stock upper bound and the cost of which has exceeded the default cost, the extra virtual machine is deleted/removed to recycle its computing resources back. The specific resource deployment procedure is as follows.

Figure 3:
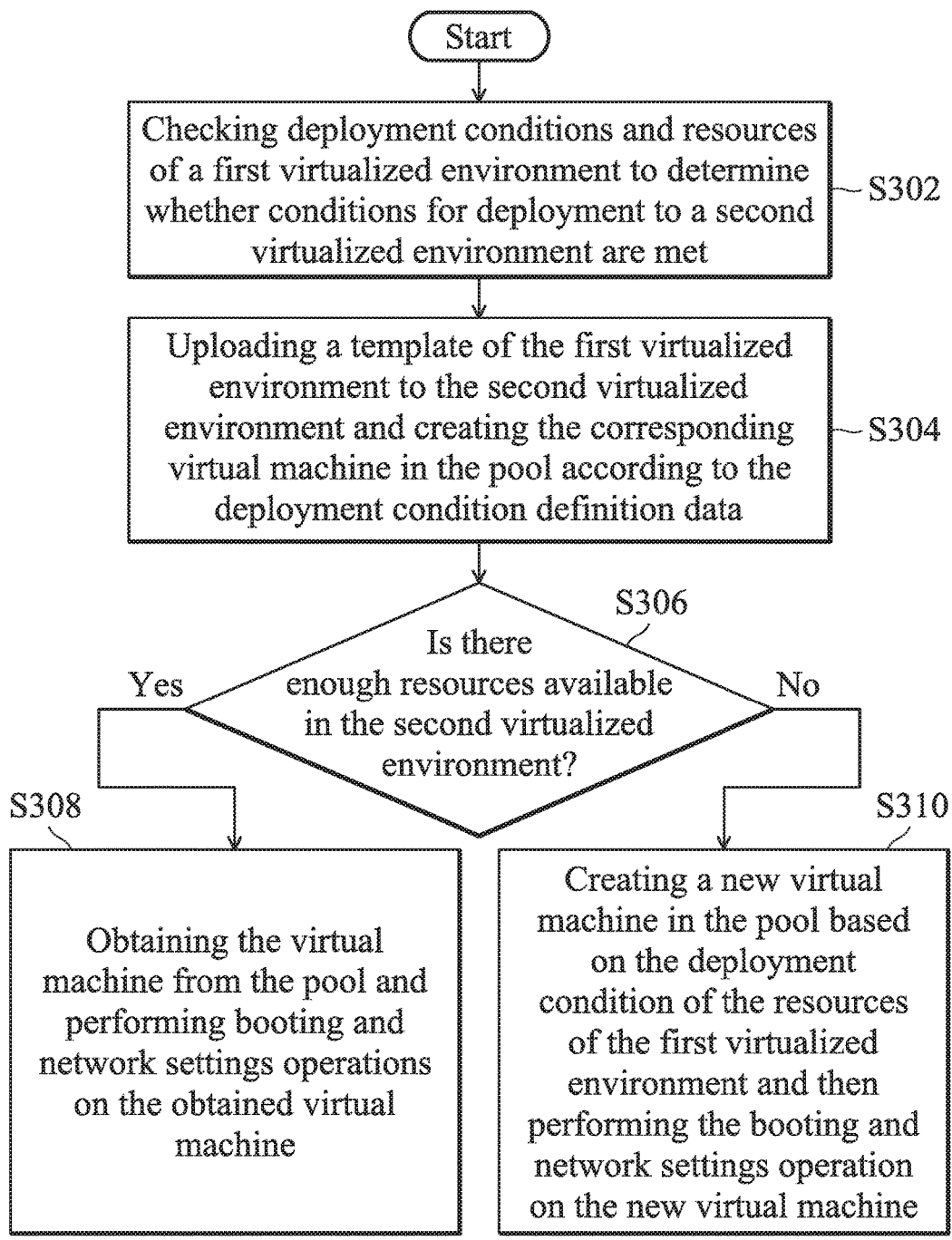
FIG. 3 is a flow chart illustrating a resource deployment procedure according to an embodiment of the present invention.

FIG. 3 is a flowchart of a resource deployment procedure according to an embodiment of the present invention. The resource deployment procedure can be performed by the resource deployment device 406 to proceed with the resource deployment of step S206 in response to the trigger signal.

While entering the resource deployment procedure, the resource deployment device 406 first checks deployment conditions and resources of the first virtualized environment to determine whether conditions for deployment to a second virtualized environment can be met (step S302), and then uploads a template of the first virtualized environment to the second virtualized environment and creates the corresponding virtual machine in the pool according to the expansion condition definition defined in the deployment condition definition data D2 (step S304). The resource deployment device 406 then determines whether the second virtualized environment has sufficient resources available (step S306). When it is determined that there is enough resources available in the second virtualized environment (i.e., the second virtualization environment has a deployment condition that conforms to that of the resource of the first virtualized environment) and the set default cost has not been exceeded (Yes in step S306), the resource deployment device 406 obtains the virtual machine from the pool and performs booting and network settings operations on the obtained virtual machine (step S308). When it is determined that the second virtualized environment does not have sufficient resources available (i.e., there is no deployment condition in the pool of the second virtualized environment that conforms to the deployment condition of the resources of the first virtualized environment) (No in step S306), the resource deployment device 406 creates a new virtual machine in the pool based on the deployment condition of the resources of the first virtualized environment and then performs the booting and network settings operations on the new created virtual machine (step S310).

The resource deployment device 406 may also perform a recycling procedure to perform a recycling operation of virtual machine in respond to a trigger signal having a deployment type of the recycling type. In some embodiments, the first virtualized environment can be a private cloud system, and the second virtualized environment can be a public cloud system. Since the public cloud environment requires cost judgment and cost control, the recycling procedure first takes into account for the resource usage statuses of the first virtualized environment. If the resources of the first virtual environment are sufficient to meet the need of the existing services, the recycling procedure will be performed to recycle the resources from the second virtualized environment. In this way, the cost of public cloud environment can be effectively reduced.

In the embodiments of the invention, the deployment target can be a virtual machine or a software service (or abbreviated as "service"). In the case of the deployment target being a virtual machine, the resource deployment device 406 can directly boot the virtual machine and join it to provide the computing service as long as there is a virtual machine available in the pool if the outward expansion mechanism that increases the computational resources has been triggered, and the resource deployment device 406 can shut down the redundant virtual machine into an stock management procedure when the inbound expansion or recycling mechanism that decreases the computational resources has been triggered.

In the example where the deployment target is a software service, the resource deployment device 406 performs the automatic expansion operation of the virtual machine when the existing virtual machine service is full or there is no virtual machine supporting the software deployment of service to increase the computing resources, and when the inbound expansion or recycling mechanism that decreases the computational resources has been triggered, the resource deployment device 406 removes the software services from the existing virtual machines. When no software service exists on a virtual machine, the resource deployment device 406 may enable the virtual machine to enter into the stock management procedure. The stock management procedure is used to shut down or remove the virtual machine based on the status of the stock pool.

Figure 4:
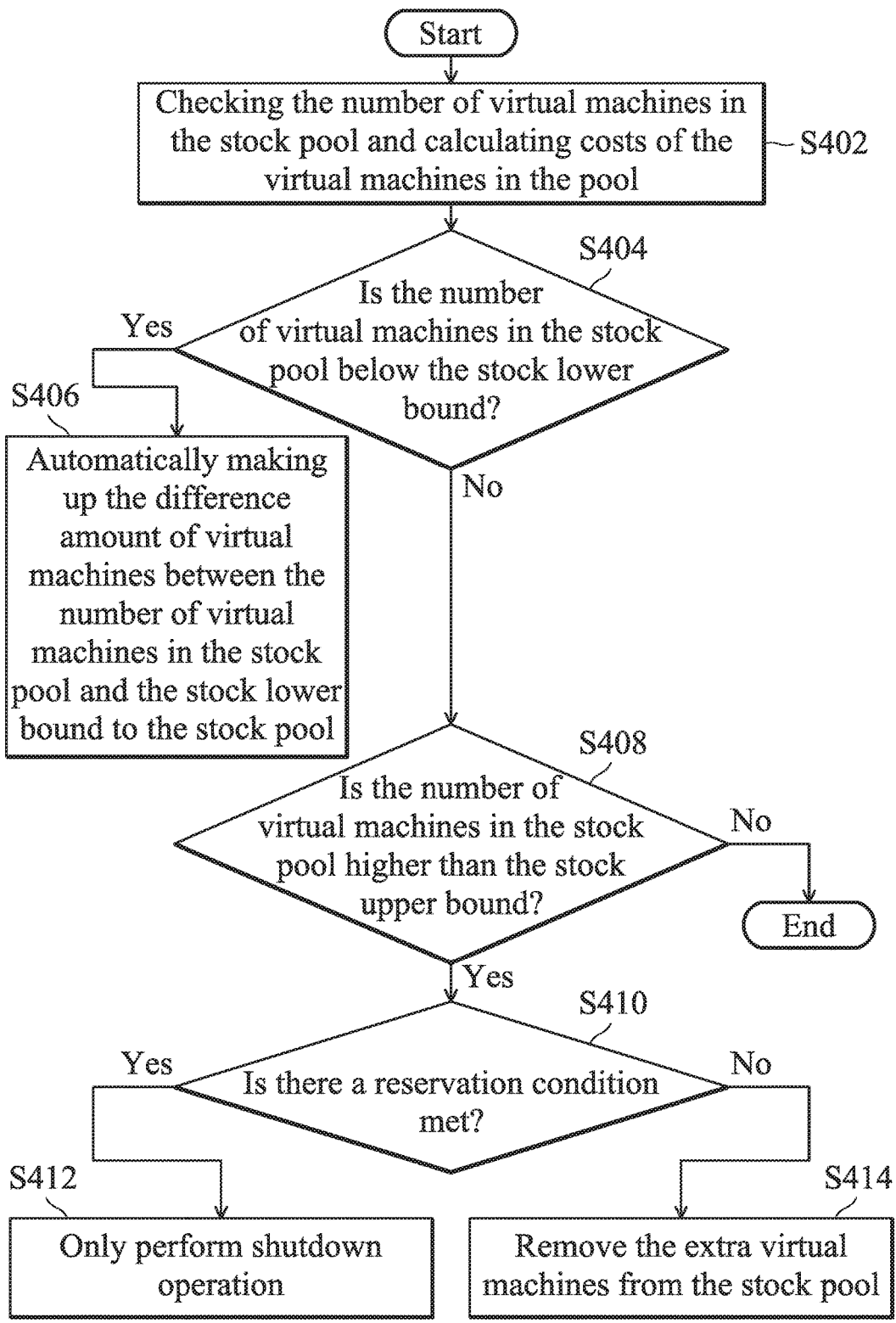
FIG. 4 is a flow chart illustrating a stock management procedure according to an embodiment of the present invention.

FIG. 4 is a flow chart of a stock management procedure according to an embodiment of the present invention. The stock management procedure can be performed by the resource deployment device 406 for stock management.

As shown in FIG. 4, after entering the stock management procedure, the resource deployment device 406 first checks the stock capacity of the virtual machines in the pool (i.e., the number of virtual machines remaining in the pool) and calculates cost of the virtual machines in the pool (step S402). Next, the resource deployment device 406 determines whether the number of virtual machines in the pool is below the stock lower bound (step S404). If the number of virtual machines in the pool is lower than the stock lower bound (Yes in step S404), the resource deployment device 406 automatically makes up a different amount of virtual machines between the number of virtual machines in the pool and the stock lower bound to the stock pool (step S406). If the number of virtual machines in the pool is equal to or greater than the stock lower bound (No in step S404), the resource deployment device 406 then determines whether the number of virtual machines in the pool is higher than the stock upper bound (step S408). If the number of virtual machines in the pool is higher than the stock upper bound (Yes in step S408), the resource deployment device 406 determines whether any reservation condition is meet to determine whether to remove at least one virtual machine from the pool to recycle the computing resource of the virtual machine being removed (step S410). In this step, the resource deployment device 406 determines whether the reservation condition is met based on the information such as the demand data for resource control and cost control defined in the reservation condition definition data D3. If it is determined that the reservation condition is met (Yes in step S410), the resource deployment device 406 only performs a shutdown operation (step S412). If it is determined that the reservation condition is not met (No in step S410), the resource deployment device 406 removes one or more extra virtual machines from the stock pool (step S414). That is, the resource deployment device 406 may decide to recycle the computing resources by removing the virtual machine or shutting down the virtual machine only based on the information such as the demand data for cost control and resource control set by the administrator in the reservation condition definition data D3. The resource deployment device 406 may automatically make up the different amount of virtual machines between the number of virtual machines in the pool and the stock lower bound when the number of virtual machines in the pool is below the stock lower bound and a total cost has not exceeded a cost upper limit. When the number of virtual machines in the pool has exceeded the stock upper bound and the total cost has exceeded the cost upper limit, the resource deployment device 406 removes the extra virtual machine in the pool to recycle the computing resources, thereby effectively controlling the cost of the second virtualized environment. It should be noted that the aforementioned data such as the stock lower bound, the stock upper bound, the cost upper limit and others can be stored in the reservation condition definition data D3.

In summary, the management systems and related management methods of cloud resources of the present invention can collect the load performance statuses of the virtual machines within the two virtualized environments and platforms and can automatically increase one or more virtual machines to provide services within a short time after detecting that the load performance statuses of the virtual machines trigger the requirement conditions or reduce the number of the virtual machines in service to recycle the computing resources when it is detected that the computing resources are sufficient. Compared with the prior art, the management systems and related management methods of cloud resources of the present invention can dynamically increase or decrease, by rules preset by the user or by automatically determination by the system, the number of virtual machines or software services, and complete the deployment operations including the creation of the virtual machine, the setting of the relevant network environment, the setting of the software service and so on, without the need for man power intervention, thus not only achieving quickly response to demand and saving manpower and costs, but also significantly improving the problem that can't automatically increase the computing resources in the prior art.

Figure 5A:
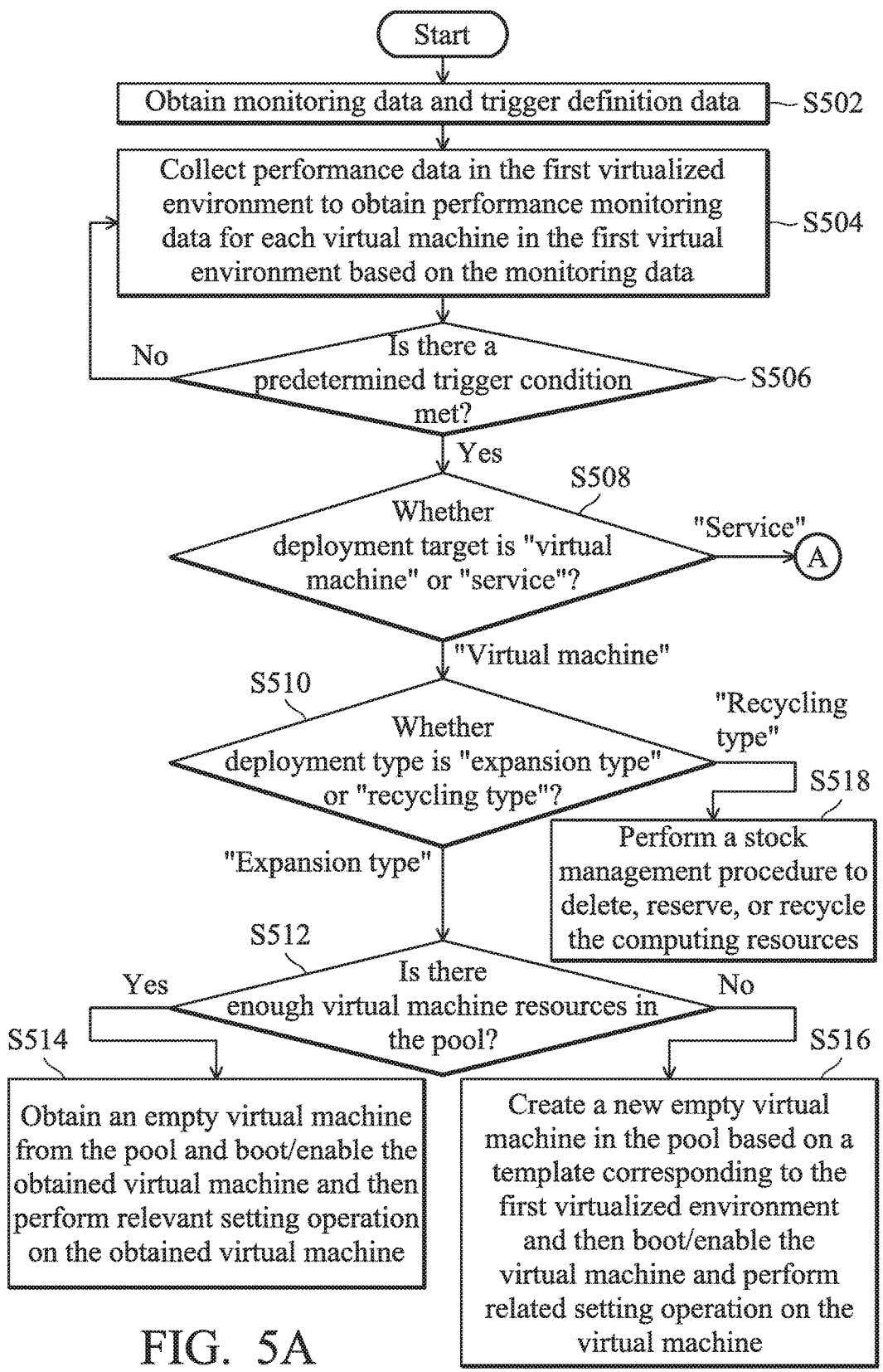
FIGS. 5A and 5B are flow charts illustrating a management method of cloud resources according to another embodiment of the present invention.
Figure 5B:
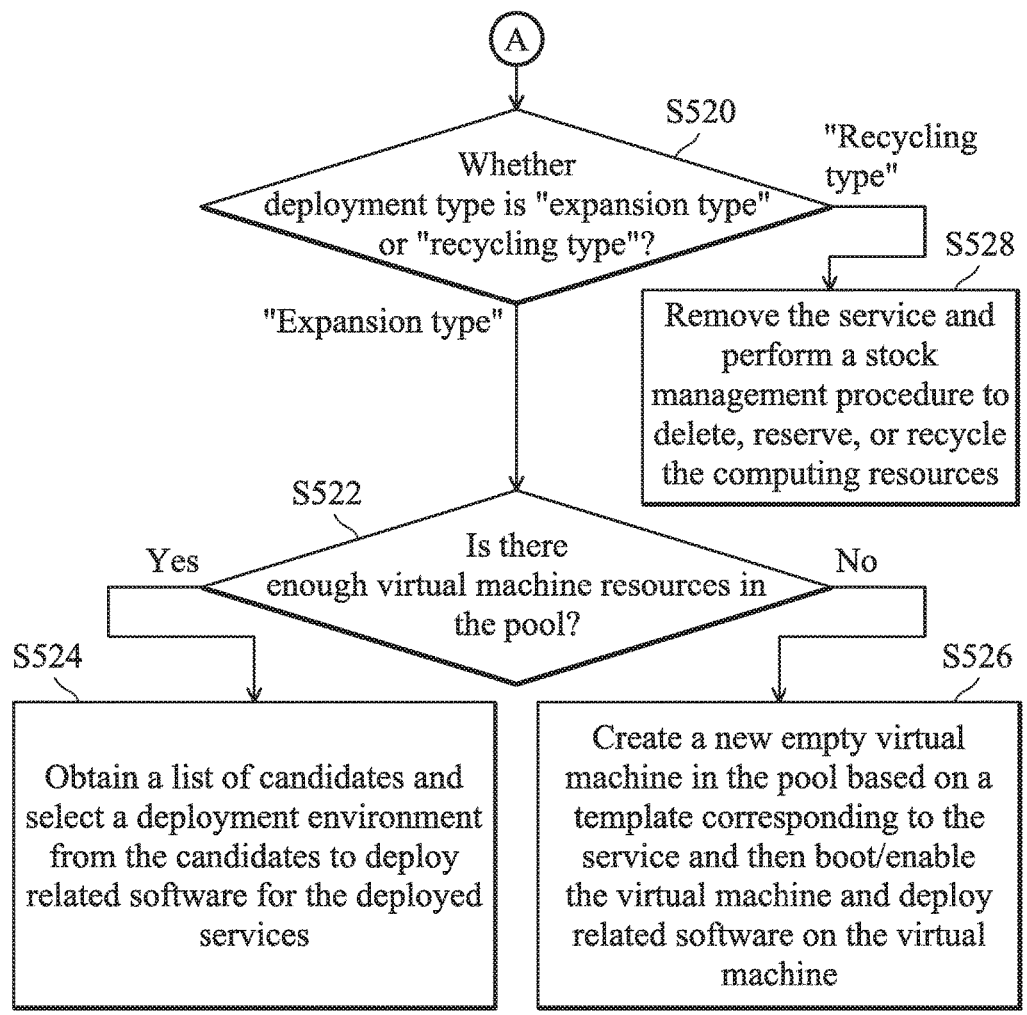

FIGS. 5A and 5B are flow charts illustrating a management method of cloud resources for use in the management system 10 according to another embodiment of the invention. Please refer to FIG. 1 to FIG. 5B. The management method for management of cloud resources can be applied to the management system 10 as shown in FIG. 1, which can remotely manage computing resources of all of virtual machines in the hybrid cloud system through the management device 400. In this embodiment, the first virtualized environment is a virtualized environment formed by all of the virtual machines 120 in the cloud system 100, the second virtualized environment is a virtualized environment formed by all of the virtual machine 220 in the cloud system 200, and the second virtualized environment is set up with a stock pool (hereinafter also referred to as a pool) having a predetermined number of virtual machines.

In step S502, the resource monitor 402 and the analysis and determination device 404 obtain the monitoring data and the trigger condition definition data from the database 408, respectively. Thereafter, in step S504, the resource monitor 402 collects performance data of each resource within the first virtualized environment based on items to be monitored indicated by the monitoring data to obtain the performance monitoring data of each virtual machine within the first virtualized environment. Detail descriptions of step S502 can be referred to descriptions of step S202 and are omitted here for brevity. In step S506, the analysis and determination device 404 analyzes data collected by the resource monitor 402 and compares those with predetermined trigger conditions defined in the trigger condition definition data that is obtained in step S502, and determines whether any trigger condition is met. If so, a trigger signal with information indicating a deployment target and a deployment type is sent and the flow proceeds to step S508; otherwise, the flow returns to step S504 to re-gather information and subsequent comparison. For example, in one embodiment, the analysis and determination device 404 may perform a weighting calculation on all of the performance monitoring data of a first virtual machine to generate an evaluation result so as to determine whether the evaluation result is greater than a predetermined threshold. The trigger condition is determined as being met when the evaluation result is greater than the predetermined threshold. Detail descriptions of the determination of whether the trigger condition is met are as described in step S204, the details of which are omitted here.

In step S508, the resource deployment device 406 prepares to perform a resource deployment procedure to determine whether the deployment target indicated by the trigger signal is a "virtual machine" or a "service". If the deployment target is the "virtual machine", the flow proceeds to steps S510 to S518; or if the deployment target is the "service", the flow proceeds to step S520.

In step S510, the resource deployment device 406 then determines whether the deployment type indicated by the trigger signal is an "expansion type" or a "recycling type". If the deployment type is the "expansion type", it indicates that the computing resources need to be increased, and the flow proceeds to steps S512 to S516 to perform the auto-expansion operation of the virtual machine. If the deployment type is the "recycling type", it indicates that the computing resources need to be decreased, and the flow proceeds to step S518 to perform the auto-recycling operation of the virtual machine. In step S512, the resource deployment device 406 checks if there is enough virtual machine resources in the pool in the second virtualized environment; if there is enough virtual machine resources, in step S514, it obtains an empty virtual machine from the pool, boots/enables the obtained virtual machine and then performs relevant setting operation such as network environment setting on the obtained virtual machine. If current virtual machine resource is not enough, in step S516, the resource deployment device 406 creates a new empty virtual machine in the pool based on a template corresponding to the first virtualized environment, and then boots/enables the obtained virtual machine and performs relevant setting operation such as network environment setting on the created virtual machine so as to join it to provide the service. It is to be noted that the creation of the empty virtual machine may be performed by creating a virtual machine based on a software template, wherein the newly created virtual machine is in a shutdown state. Thereafter, the virtual machine in the shutdown state can be activated through the boot program to become a turned-on state to prepare for service configuration.

In step S518, in which the deployment type is set to the "recycling type", the resource deployment device 406 performs the stock management procedure as shown in FIG. 4 to shut down or remove the redundant virtual machine in the pool to delete, reserve, or recycle computing resources. The step of shutting down the virtual machine is used to shut the virtual machine down. After the shutdown of the virtual machine, it can be re-booted by the corresponding boot procedure without needing to re-create it.

In step S520, in which the deployment target is set to the "service", and the resource deployment device 406 then determines whether the deployment type indicated by the trigger signal is an "expansion type" or a "recycling type". If the deployment type is the "expansion type", it indicates that the computing resources need to be increased, and the flow proceeds to steps S522 to perform the auto-expansion operation of the software. If the deployment type is the "recycling type", it indicates that the computing resources need to be decreased, and the flow proceeds to step S528 to perform the auto-recycling operation of the software. In step S522, the resource deployment device 406 checks if there is enough virtual machine resources in the pool in the second virtualized environment; if there is enough virtual machine resources, in step S524, it obtains a list of candidates and selects a deployment environment to deploy related software for the deployed service. If current virtual machine resource is not enough, in step S526, the resource deployment device 406 creates a new empty virtual machine in the pool based on a template corresponding to the deployed service, and then boots/enables the obtained virtual machine and deploys related software on the created virtual machine.

In step S528, in which the deployment type is set to the "recycling type", the resource deployment device 406 deletes or removes the software deployment corresponding to the service on the virtual machine and performs the stock management procedure as shown in FIG. 4 to delete, reserve or recycle the computing resources. Removal of the software deployment corresponding to the service on the virtual machine is used to remove one of the deployed services from the virtual machine that has been deployed with one or more services, such as removing a specified Service A by removing the associated software settings for the Service A.

Therefore, the management systems and related management methods of cloud resources of the present invention can provide a cloud resource adjustment mechanism in the system architecture using the hybrid cloud system to automatically collect a verity of status data and data required for subsequent determinations of the virtual machines within different cloud systems and perform a verity of determinations based on predetermined trigger conditions and set rules, such that virtual machine resources can be automatically allocated to the remote cloud system to increase service computing resources when the virtual machine resources at local cloud server are not enough and operations to reallocate or expand the resources can be automatically triggered when the set rule condition is reached, and wherein a determination of whether the standard is met can be periodically monitored according to the established rules and when the standard is reached, the virtual machine resource expansion and resource recycling operations can be automatically performed, so as to effectively reduce the time required for replying to the requirements of computing resources and shorten the time of resource construction through above-mentioned automatic mechanism, thereby not only reducing the possibility of manmade error, but also effectively reducing the intervention and cost of man power and achieving a goal for effective management.

The embodiments of methods that have been described, or certain aspects or portions thereof, may be practiced in logic circuits, or may take the form of program code (i.e., instructions) embodied in tangible media, such as floppy diskettes, CD-ROMS, hard drives, or any other machine-readable storage medium, wherein, when the program codes are loaded into and executed by a machine, such as a smartphone, a mobile phone, or a similar device, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, the machine becomes an apparatus for practicing the invention. When implemented on a general-purpose processor, the program codes combine with the processor to provide a unique apparatus that operate analogously to specific logic circuits.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. On the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:

1. A management method of cloud resources for use in a hybrid cloud system with first and second cloud systems, wherein the first cloud system includes first servers operating first virtual machines (VMs) and the second cloud system includes second servers operating second VMs, the method comprising:

obtaining, by a resource monitor, a plurality of performance monitoring data of the first VMs within the first servers;

analyzing, by an analysis and determination device, the performance monitoring data of the first VMs to automatically send a trigger signal in response to determining that a predetermined trigger condition is met, wherein the trigger signal includes a deployment target and a deployment type; and automatically performing, by a resource deployment device, an operation corresponding to the deployment type on the deployment target in the second VMs of the second cloud system in response to the trigger signal, wherein the deployment type comprises a recycling type and the operation corresponding to the deployment type is a recycling operation, the recycling operation comprising at least one of the following operations: removing software deployment corresponding to a service deployed on a VM, shutting down an empty or idle VM and removing a VM and wherein the deployment type comprises an expansion type and the operation corresponding to the deployment type is an expansion operation, the expansion operation comprising at least one of the following operations: creating an empty VM, booting a VM and performing software deployment on the created VM, wherein the deployment target further comprises a service and a VM and the method further comprises: when the deployment target is the service, the resource deployment device scoring the second VMs according to a setting condition and a scoring condition corresponding to the service and performing software deployment of the service on one of the VMs which is selected based on the scoring result; and when the deployment target is the VM, the resource deployment device creating the VM based on a deployment condition.

2. The management method of claim 1, wherein the step of analyzing, by the analysis and determination device, the performance monitoring data of the first VMs to automatically send a trigger signal in response to determining that the predetermined trigger condition is met further comprises: performing a weighting calculation on the performance monitoring data of the first VMs to generate an evaluation result; determining whether the evaluation result is greater than a predetermined threshold value; and determining that the predetermined trigger condition is met when the evaluation result is greater than the predetermined threshold value.

3. The management method of claim 2, wherein the step of automatically performing the operation corresponding to the deployment type on the deployment target in the second VMs of the second cloud system further comprises: uploading a template from the first cloud system to the second cloud system and creating a VM based on the template.

4. The management method of claim 1, wherein the resource deployment device further selects one corresponding to the service to be removed from the second servers to remove the software deployment for the service and shuts down or removes the selected second server if the software deployment for the service has been removed and no other service is deployed on the selected second server when the recycling operation is triggered.

5. The management method of claim 1, further comprising: providing a stock pool in the second cloud system, wherein the stock pool comprises the second VMs; checking a capacity and calculating cost for the second VMs in the stock pool; automatically adding an amount of the second VMs equal to a difference between the capacity of the second VMs in the stock pool and the lower bound to the stock pool when the capacity of the second VMs in the stock pool is below a lower bound and the cost has not exceeded a default cost; and removing at least one second VM from the stock pool to recycle the computing resources of the removed second VM when the capacity of the second VMs in the stock pool is higher than an upper bound and the cost has exceeded the default cost.

6. A management system of cloud resources, comprising:
memory;
a first cloud system comprising a plurality of first servers, wherein the first servers are operating a plurality of first virtual machines (VMs);
a second cloud system comprising a plurality of second servers, wherein the second servers are operating a plurality of second VMs; and
a management device coupled to the first cloud system and the second cloud system via a network, comprising:
a resource monitor coupled to the first VMs and the second VMs, collecting and obtaining a plurality of performance monitoring data of the first VMs within the first servers;
an analysis and determination device coupled to the resource monitor, analyzing the performance monitoring data of the first VMs to automatically send a trigger signal in response to determining that a predetermined trigger condition is met, wherein the trigger signal includes a deployment target and a deployment type; and
a resource deployment device coupled to the analysis and determination device, automatically performing, by a resource deployment device, an operation corresponding to the deployment type on the deployment target in the second VMs of the second cloud system in response to the trigger signal, wherein the deployment type comprises a recycling type and the operation corresponding to the deployment type is a recycling operation, the recycling operation comprising at least one of the following operations: removing software deployment corresponding to a service deployed on a VM, shutting down an empty or idle VM and removing a VM and wherein the deployment type comprises an expansion type and the operation corresponding to the deployment type is an expansion operation, the expansion operation comprising at least one of the following operations: creating an empty VM, booting a VM and performing software deployment on the created VM, wherein the deployment target further comprises a service and a VM and the method further comprises: when the deployment target is the service, the resource deployment device scoring the second VMs according to a setting condition and a scoring condition corresponding to the service and performing software deployment of the service on one of the VMs which is selected based on the scoring result; and when the deployment target is the VM, the resource deployment device creating the VM based on a deployment condition.

7. The management system of claim 6, further comprising a database for storing information on a plurality of predetermined trigger condition definition data for the analysis and determination device to determine whether the predetermined trigger condition is met based on the predetermined trigger condition definition data and the performance monitoring data.

* * * * *